(Model.)
2 Sheets—Sheet 1.
L. A. HAGAN.
Device for Copying and Enlarging Pictures.
No. 241,801. Patented May 24, 1881.
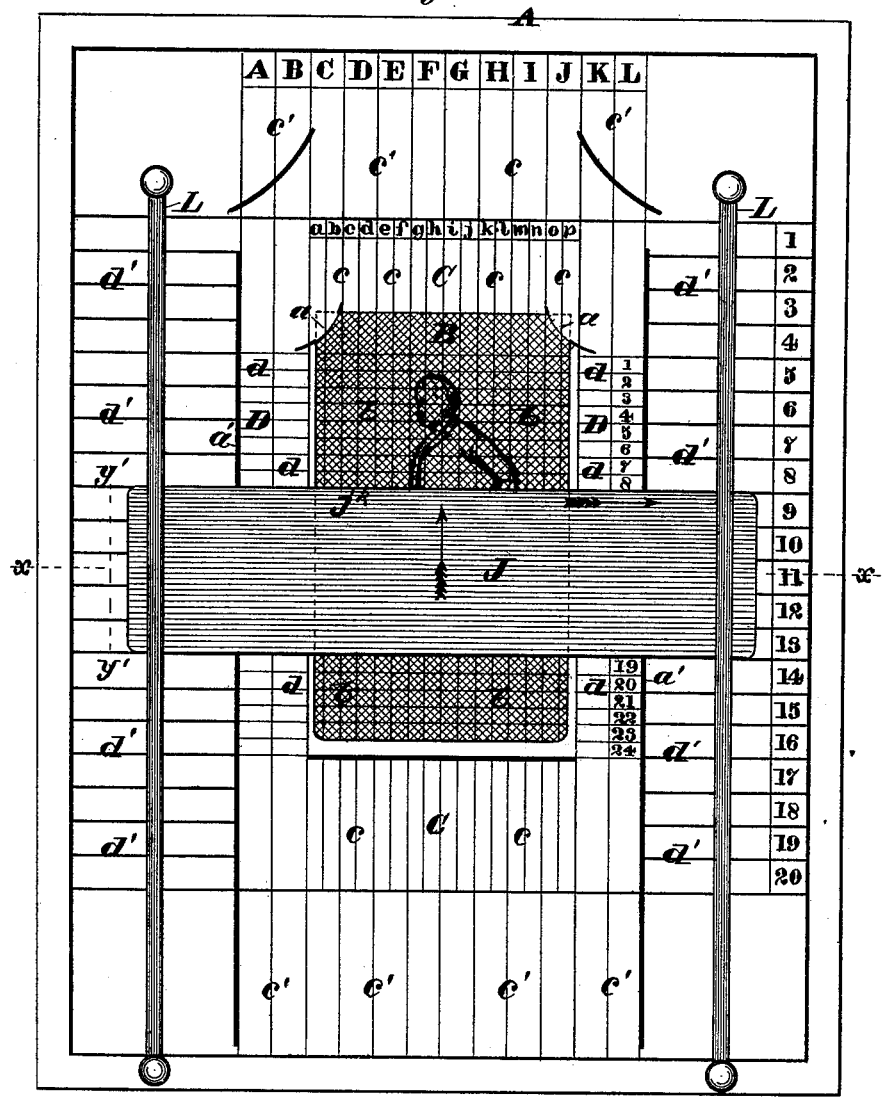
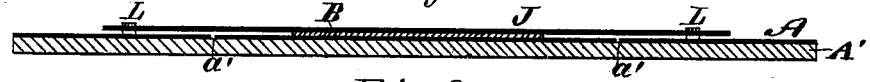
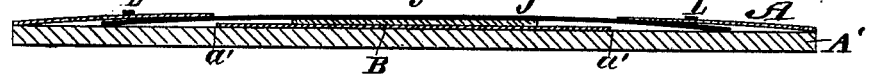
Attest:
Charles Pickles
Inventor:
Levi A. Hagan
by C. D. Moody
atty.
N. PETERS, Photo-Lithographer, Washington, D. C.

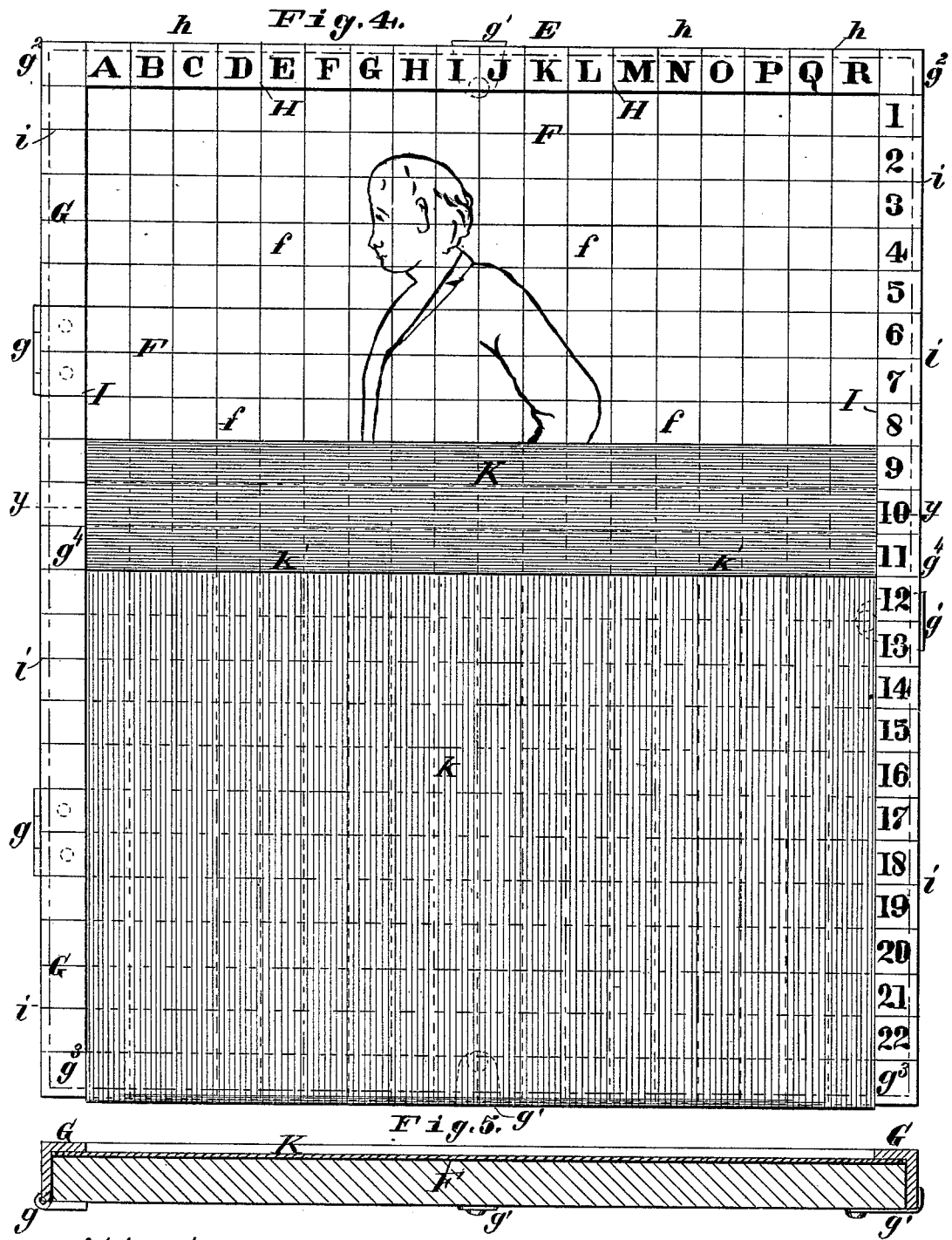

UNITED STATES PATENT OFFICE.

LEVI A. HAGAN, OF ST. LOUIS, MISSOURI.

DEVICE FOR COPYING AND ENLARGING PICTURES.

SPECIFICATION forming part of Letters Patent No. 241,801, dated May 24, 1881.

Application filed August 19, 1880. (Model.)

*To all whom it may concern:*

Be it known that I, LEVI A. HAGAN, of St. Louis, Missouri, have made a new and useful Improvement in Devices for Copying and Enlarging Pictures, of which the following is a full, clear, and exact description, reference being had to the annexed drawings, making part of this specification, in which—

Figure 1 is a plan of the tablet used in holding the picture to be copied; Fig. 2, a section taken on the line $x\,x$ of Fig. 1; Fig. 3, a similar section, but showing the slide in a different position; Fig. 4, a plan of the drawing-board used in copying the picture, the paper upon which the picture is to be drawn being mounted on the board; Fig. 5, a section taken on the line $y\,y$ of Fig. 4, and Fig. 6, a detail, being a sectional view taken on the line $y'\,y'$ of Fig. 1.

The same letters denote the same parts.

The aim of this invention is to provide an improved means for copying and enlarging pictures. It is a convenience, even to experienced draftsmen and artists, as with it a picture can be more readily copied; but it is especially adapted to unskilled persons, to children, and beginners in sketching and drawing.

It consists in the combination of a tablet that holds the picture being copied or enlarged, and which is provided with a vertical and also a horizontal graduation, by means whereof the picture can be marked off in squares; and a drawing-board that holds the paper upon which the picture is copied, and which is furnished with a folding frame for holding the paper down upon the board, and graduations corresponding to those upon the tablet, for the purpose of marking the paper in squares corresponding in position and proportions or multiples of the proportions to those upon the original picture, both tablet and board being respectively furnished with a movable slide that can be moved from square to square over the original picture and paper respectively, and be used to aid the eye and hand of the operator, as hereinafter more particularly set forth.

Referring to the drawings, A represents the tablet used in holding and in laying off the squares or spaces upon the original picture or the one that is to be copied. The picture B is arranged at or near the center of the tablet, being held at or in a certain point therein, and preferably by inserting the upper corners of the picture in openings $a\,a$ in the tablet.

C represents a series of spaces laid off vertically on the tablet above and beneath the space occupied by the picture, the lines $c\,c\,c$ of the series being spaced evenly apart. The spaces between the lines $c\,c\,c$ may be designated in any suitable way, as by letters $a\,b\,c\,d\,e\,f$, as shown.

D represents another series of spaces laid off horizontally on the tablet at the sides of the picture-space, the lines $d\,d\,d$ of the series being spaced evenly apart, and the spaces formed thereby being designated, say, by the figures 1 2 3 4, as shown.

The picture to be copied is fixed in its place upon the tablet, as shown. Then, by drawing a series of lines on the picture coinciding with the lines $c\,c\,c$ and a series of lines coinciding with the lines $d\,d\,d$, the picture is laid off in squares $b\,b\,b$, and is now ready for copying.

E represents the drawing-board. It is of suitable size to enable the copy to be of the desired proportions. The paper F is placed upon the board and there held by means of a frame, G, that is hinged to the board at $g$, and shaped and fitted to fold down over the edges of the board and draw the interlaid paper F tightly thereupon, as shown in Figs. 4 and 5. The frame, when closed upon the board, is held by the clasp $g'$. By means of the lines $h\,h\,h$ a series, H, of spaces is laid off upon the top edge, $g^2$, and bottom edge, $g^3$, of the frame, the spaces being designated A B C D E, as shown, to correspond to the series C of the tablet. Upon the side edges, $g^4\,g^4$, of the frame another series I, by means of the lines $i\,i\,i$, and designated 1 2 3 4 5, is laid off. The drawing-paper F, by drawing lines thereon coinciding with the lines $h\,h\,h$ and $i\,i\,i$, respectively, is then laid off in squares $f\,f\,f$, as shown. The lines $h\,h\,h$ and $i\,i\,i$ are respectively spaced apart to correspond to the distance or a multiple of the distance that separates the lines $c\,c\,c$ and $d\,d\,d$, respectively, of the tablet A. The size of the squares $f\,f\,f$ upon the paper F therefore corresponds to that of the squares $b\,b\,b$ upon the picture B; or, if the squares $f$ are larger than the squares $b$, as is the case when it is desired to enlarge the picture in copying it, the enlargement is symmetrical. The operator then proceeds to draw the copy upon the paper F, in doing which he uses those of the squares $f$ that correspond in number and letter to those of the squares $b$, occupied by the original picture, so that when the copy is completed upon the paper F it will extend over the same squares, by letter and number, of the series H and I as the original picture does of the series C and D. In doing this portion of the work the slides J and K of the tablet and board, respectively, are brought into requisition. The slide J is in the form of a plate, and is arranged to be moved up and down upon the tablet A and picture B, and to cover and conceal such portion of the latter as may be desired. It is kept from slipping from the position in which it is to be temporarily held partly by means of the bands L L and partly by having a small flange, $j$, upon the under side of the slide engage in grooved indentations $j'$ $j'$ in the tablet, as shown in Fig. 6. These indentations may be the lines $d'$ or $c'$. The aim of the slide is mainly this: It is desirable in copying for the attention to be directed exclusively to that particular part of the picture that is at the moment being drawn. The slide therefore is used to conceal the uncopied portion of the picture, and in practice as follows: Beginning at the top of the picture B, the slide is moved to bring its upper edge, $j^2$, say to coincide with the horizontal line separating the spaces 2 and 3 of the series D. The slide K is correspondingly arranged upon the paper F. That portion of the picture that is upon the squares $b$ above the slide J is then copied upon the paper above the slide K. The slides J and K are then slipped down upon the picture and paper, respectively, to bring their upper edges to coincide with the line between the spaces 3 and 4 of the series D and I, respectively. That portion of the picture that is upon the horizontal tier of spaces immediately above the slide J is then copied, and upon those of the squares $f$ that are immediately above the slide K, and so on until the operation is completed.

All errors in copying are practically prevented, as the lines of the squares serve as guides and checks to the eye and hand, and to preserve the proper proportions of the drawing.

The slide K is held down upon the paper F by means of the frame G, the pressure of the latter being sufficient to prevent the slide from moving. To protect the paper F from being soiled the slide K may have a cloth, $k$, attached to its lower edge, K'. As the slide is moved down upon the paper the cloth being flexible can be folded out of the way.

To provide for larger pictures than B the tablet A may have another double series, $c'$ $c'$ $c'$ and $d'$ $d'$ $d'$, of lines arranged upon the tablet in positions corresponding to the lines $c$ $c$ $c$ and $d$ $d$ $d$; but, if desired, spaced farther apart. The lines upon the picture are then drawn to coincide with the lines $c'$ $c'$ $c'$ and $d'$ $d'$ $d'$.

If desired, the slide J may be held upon the tablet by slitting the latter at $a'$ $a'$ and inserting the ends of the slide in the openings thus formed, as seen in Fig. 3, the entire tablet proper being, in practice, made of sheet metal and sufficiently elastic to enable the slide to be inserted, as described.

The slides J and K also serve to support the hand of the operator in marking the original picture and in drawing the copy, respectively.

The tablet A may be mounted upon a support or back, A', as shown.

I claim—

1. The combination of the tablet A, graduated at C and D, as described, and having a central space within the graduations to receive the picture B to be copied or enlarged, and also having means for holding the picture upon the tablet while being copied, and the board E, having the graduated, hinged, and folding frame G, substantially as described.

2. The combination of the graduated tablet A, board E, graduated frame G, and slides J and K, substantially as described.

3. The combination of the board E, the hinged and graduated frame G, and the slide K, substantially as described.

4. The combination of the tablet A, having the indentations $j'$ $j'$, and the slide J, having the flange $j$, substantially as described.

5. The combination of the tablet A, indented at $j'$ $j'$, the bands L L, and the slide J, having the flange $j$, substantially as described.

L. A. HAGAN.

Witnesses:
CHAS. D. MOODY,
CHARLES PICKLES.